(12) United States Patent
Bohle et al.

(10) Patent No.: US 7,921,164 B2
(45) Date of Patent: Apr. 5, 2011

(54) METHOD AND APPARATUS FOR STOPPING OUTPUT OF A CORRESPONDENCE

(75) Inventors: Holger Bohle, Diechein (DE); Simone Buchwald, Heidelberg (DE); Thomas Scharf, Rauenberg (DE)

(73) Assignee: SAP AG, Walldorf (DE)

( * ) Notice: Subject to any disclaimer, the term of this patent is extended or adjusted under 35 U.S.C. 154(b) by 1103 days.

(21) Appl. No.: 11/262,580

(22) Filed: Oct. 31, 2005

(65) Prior Publication Data

US 2007/0100945 A1    May 3, 2007

(51) Int. Cl.
*G06F 15/16* (2006.01)
(52) U.S. Cl. .................................... 709/206; 709/207
(58) Field of Classification Search .................. 705/51; 709/203–247; 726/26–33; 715/530
See application file for complete search history.

(56) References Cited

U.S. PATENT DOCUMENTS

| | | | |
|---|---|---|---|
| 5,668,880 A * | 9/1997 | Alajajian | 370/342 |
| 5,978,568 A * | 11/1999 | Abraham et al. | 709/224 |
| 6,668,281 B1 * | 12/2003 | Ayyadurai | 709/223 |
| 6,944,662 B2 * | 9/2005 | Devine et al. | 709/225 |
| 7,213,209 B2 * | 5/2007 | Lueckhoff et al. | 715/747 |
| 7,295,851 B2 * | 11/2007 | Liu et al. | 455/517 |
| 7,406,504 B2 * | 7/2008 | Paul | 709/206 |
| 2002/0103858 A1 * | 8/2002 | Bracewell et al. | 709/203 |
| 2003/0135499 A1 * | 7/2003 | Schirmer et al. | 707/6 |
| 2003/0182234 A1 * | 9/2003 | Degroot | 705/51 |
| 2004/0138936 A1 * | 7/2004 | Johnson et al. | 705/7 |
| 2004/0243844 A1 * | 12/2004 | Adkins | 713/201 |
| 2005/0060433 A1 * | 3/2005 | Choi | 709/247 |
| 2007/0028166 A1 * | 2/2007 | Hundhausen et al. | 715/530 |
| 2007/0233751 A1 * | 10/2007 | Sampson | 707/201 |

* cited by examiner

*Primary Examiner* — Bunjob Jaroenchonwanit
(74) *Attorney, Agent, or Firm* — Kenyon & Kenyon LLP

(57) ABSTRACT

Method and apparatus for stopping output of a correspondence are provided. A correspondence is created and it is determined whether an automatic flag is defined in the user settings for the correspondence and if the automatic flag is set. If it is determined that the automatic flag is not defined in the user settings, it is determined whether an automatic flag is defined in customizing for the correspondence. If the automatic flag is not set in the user settings or the automatic flag is not defined in the customizing, the correspondence is stored in a storage area and output is initiated. The correspondence is then rendered.

40 Claims, 10 Drawing Sheets

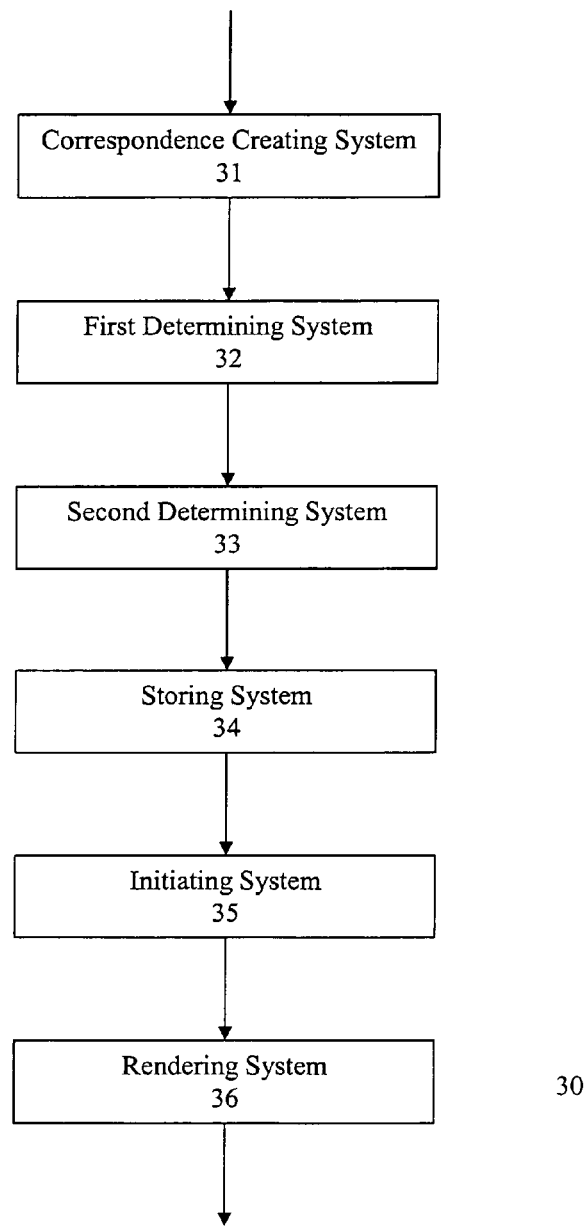

FIGURE 5

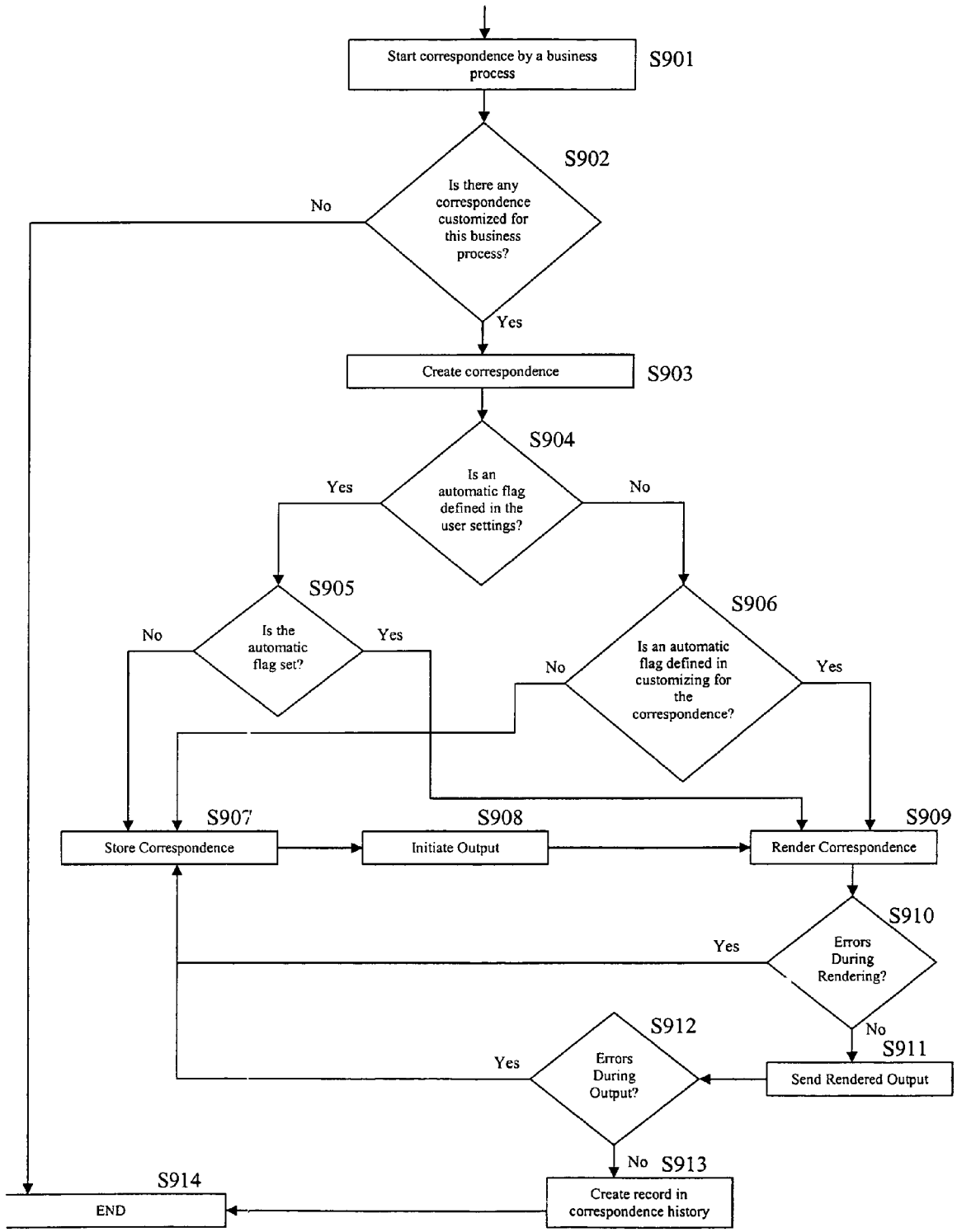

METHOD AND APPARATUS FOR STOPPING OUTPUT OF A CORRESPONDENCE

BACKGROUND

1. Technical Field

The present disclosure relates generally to application services and, more particularly, to a method and apparatus for stopping output of a correspondence.

2. Description of the Related Art

Many applications which automatically send responses to users are currently in use. One type of an automatic response that may be generated is a correspondence. A correspondence may be generated by a generic service of an application. For example, a process running in an application may call this generic service to send messages to a user, for example, messages in the form of a confirmation. Correspondence may be sent through many different channels (for example, Short Message Service ("SMS"), e-mail, facsimile, printers, etc.) and may be in a variety of different formats (for example, Portable Document Format ("PDF"), Hypertext Markup Language ("HTML"), text documents, etc.).

Conventional correspondence is generated and automatically output without any human interaction. FIG. 1 is a flow chart illustrating a conventional method of generating and outputting correspondence. A business process triggers a correspondence (Step S101) and the correspondence is customized (Step S102) for the particular business process. For example, in a training management system, a system used by training managers to manage training programs for an entity, the business process could be a cancellation process, booking process, or buying process and depending on the process, different customization may be required. The correspondence is rendered, (Step S103) output (Step S104) and checked for errors in transmission (Step S105). The rendering process may include the merging of business data into a template.

These conventional techniques do not allow users to review or change a correspondence before it is output. For example, in a training management system, users may want to stop the output of a correspondence based on certain parameters, such as, training results, users, date, and/or recipients of the correspondence.

Accordingly, there is a need for a reliable and efficient way to stop output of a correspondence, so that a user can review or change the correspondence before it is output.

SUMMARY

This application describes tools (in the form of methodologies, apparatuses, and systems) for stopping output of a correspondence. The tools may be embodied in one or more computer programs stored on a computer readable medium or program storage device and/or transmitted in the form of a computer data signal in one or more segments via a computer network or other transmission medium.

A method for stopping output of a correspondence, according to an embodiment of the present disclosure, includes creating a correspondence, determining whether an automatic flag is defined in user settings for the correspondence and determining if the automatic flag is set, determining whether an automatic flag is defined in customizing for the correspondence, if it is determined that the automatic flag is not defined in the user settings, storing the correspondence in a storage area if it is determined that the automatic flag is not set in the user settings or if the automatic flag is not defined in the customizing, initiating output if it is determined that the automatic flag is not set in the user settings or if the automatic flag is not defined in the customizing; and rendering the correspondence.

An apparatus for stopping output of a correspondence, according to an embodiment of the present disclosure, includes creating means for creating a correspondence, first determining means for determining whether an automatic flag is defined in user settings for the correspondence and determining if the automatic flag is set, second determining means for determining whether an automatic flag is defined in customizing for the correspondence, if it is determined that the automatic flag is not defined in the user settings, storing means for storing the correspondence in a storage area if it is determined that the automatic flag is not set in the user settings or if the automatic flag is not defined in the customizing, and initiating means for initiating output if it is determined that the automatic flag is not set in the user settings or if the automatic flag is not defined in the customizing, and rendering means for rendering the correspondence.

A computer storage medium including computer executable code for stopping output of a correspondence may, according to an embodiment of the present disclosure, include code for code for creating a correspondence, code for determining whether an automatic flag is defined in user settings for the correspondence and determining if the automatic flag is set, code for determining whether an automatic flag is defined in customizing for the correspondence, if it is determined that the automatic flag is not defined in the user settings, code for storing the correspondence in a storage area if it is determined that the automatic flag is not set in the user settings or if the automatic flag is not defined in the customizing, code for initiating output if it is determined that the automatic flag is not set in the user settings or if the automatic flag is not defined in the customizing, and code for rendering the correspondence.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein:

FIG. 3A shows a block diagram illustrating an apparatus for stopping the output of a correspondence, according an embodiment of the present disclosure;

FIG. 5 shows a block diagram illustrating a storage area, according to an embodiment of the present disclosure;

FIG. 9 shows a flow chart illustrating a method for stopping the output of a correspondence, according to an embodiment of the present disclosure.

DETAILED DESCRIPTION

The following exemplary embodiments are set forth to aid in an understanding of the subject matter of this disclosure, but are not intended, and may not be construed, to limit in any way the claims which follow thereafter. Therefore, while specific terminology is employed for the sake of clarity in describing some exemplary embodiments, the present disclosure is not intended to be limited to the specific terminology so selected, and it is to be understood that each specific element includes all technical equivalents which operate in a similar manner.

Figure 1:
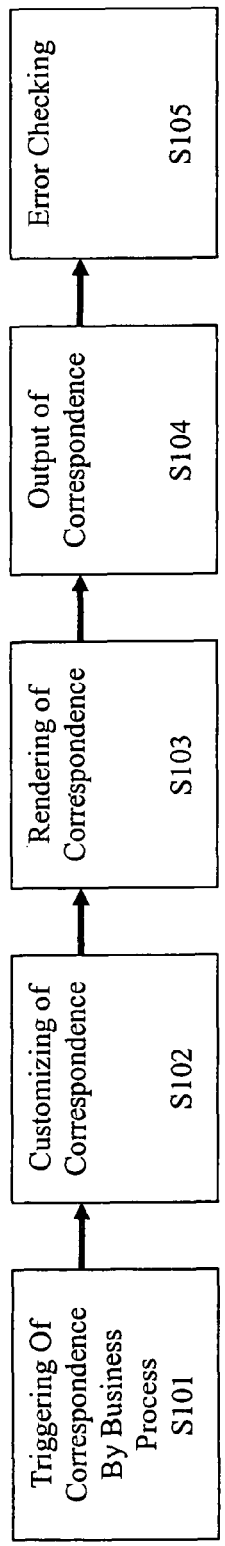
FIG. 1 shows a flow chart illustrating a conventional method of generating and outputting a correspondence.
Figure 2:
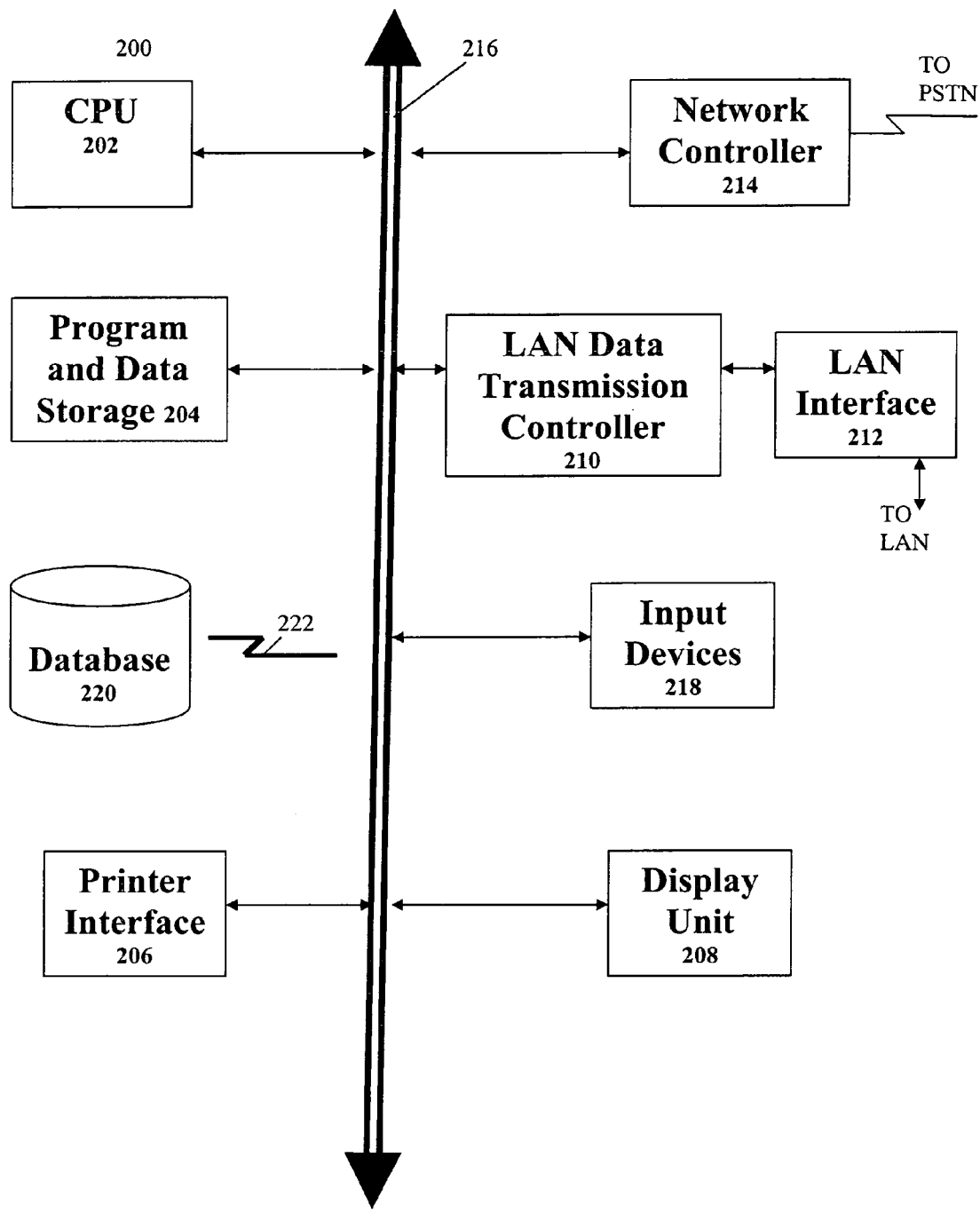
FIG. 2 shows a block diagram of an exemplary computer system capable of implementing the method and system of the present disclosure.

FIG. 2 shows an example of a computer system 200 which may implement the method and apparatus of the present disclosure. The apparatus and method of the present disclosure may be implemented in the form of a software application running on a computer system, for example, a mainframe, personal computer (PC), handheld computer, server, etc. The software application may be stored on a recording media locally accessible by the computer system, for example, floppy disk, compact disk, hard disk, etc., or may be remote from the computer system and accessible via a hard wired or wireless connection to a network, for example, a local area network, or the Internet.

The computer system 200 can include a central processing unit (CPU) 202, program and data storage devices 204, a printer interface 206, a display unit 208, a (LAN) local area network data transmission controller 210, a LAN interface 212, a network controller 214, an internal bus 216, and one or more input devices 218 (for example, a keyboard, mouse etc.). As shown, the system 200 may be connected to a database 220, via a link 222.

The computer system 200 is merely exemplary. The specific embodiments described herein are illustrative, computer system(s) as referred to herein may include(s) individual computers, servers, computing resources, networks, etc., and many variations can be introduced on these embodiments without departing from the spirit of the disclosure or from the scope of the appended claims.

An apparatus for stopping output of a correspondence, according to one embodiment of the disclosure, will be discussed with reference to FIG. 3A. The apparatus 30 includes a correspondence creating system 31, first determining system 32, second determining system 33, storing system 34, initiating system 35, and rendering system 36. The correspondence creating system 31 creates a correspondence. A first determining system 32 determines whether an automatic flag is defined in user settings for the correspondence and determines if the automatic flag is set. The second determining system 33 determines whether an automatic flag is defined in customizing for the correspondence, if it is determined that the automatic flag is not defined in the user settings. The storing system 34 stores the correspondence in the storage area if it is determined that the automatic flag is not set in the user settings or if the automatic flag is not defined in the customizing. The initiating system 35 initiates output if it is determined that the automatic flag is not set in the user settings or if the automatic flag is not defined in the customizing. The rendering system 36 renders the correspondence. It should be apparent that correspondence creating system 31, first determining system 32, second determining system 33, storing system 34, initiating system 35 and rendering system 36 may be respective portions of, or routines in, a computer program which stops output of a correspondence (and perhaps performs other functions).

Figure 3B:
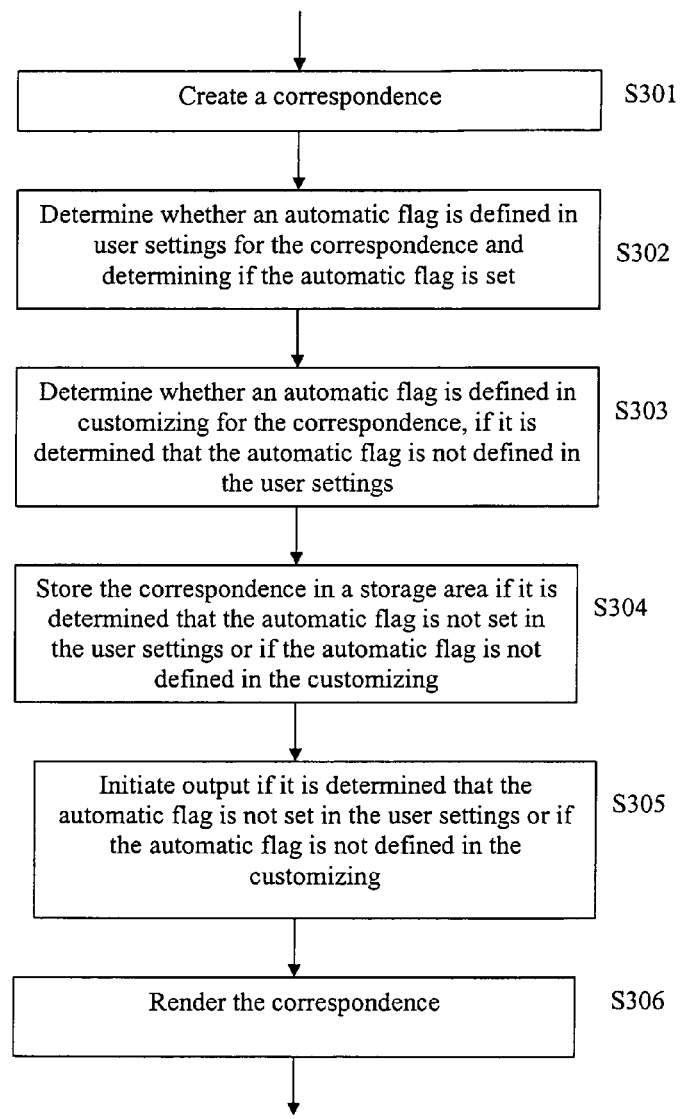
FIG. 3B shows a flow chart illustrating a method for stopping the output of a correspondence, according to an embodiment of the present disclosure.

A method for stopping output of a correspondence, will be explained below with reference to FIGS. 3A and 3B. The correspondence creating system 31 creates a correspondence (Step S301). The correspondence may be created by merging data into a template. The first determining system 32 determines whether an automatic flag is defined in user settings for the correspondence and determining if the automatic flag is set (Step S302). The second determining system 33 determine whether an automatic flag is defined in customizing for the correspondence, if it is determined that the automatic flag is not defined in the user settings (Step S303). The storing system 34 stores the correspondence in a storage area if it is determined that the automatic flag is not set in the user settings or if the automatic flag is not defined in the customizing (Step S304). The initiating system 35 initiates output if it is determined that the automatic flag is not set in the user settings or if the automatic flag is not defined in the customizing (Step S305). The rendering system 36 renders the correspondence (Step S306).

Figure 4:
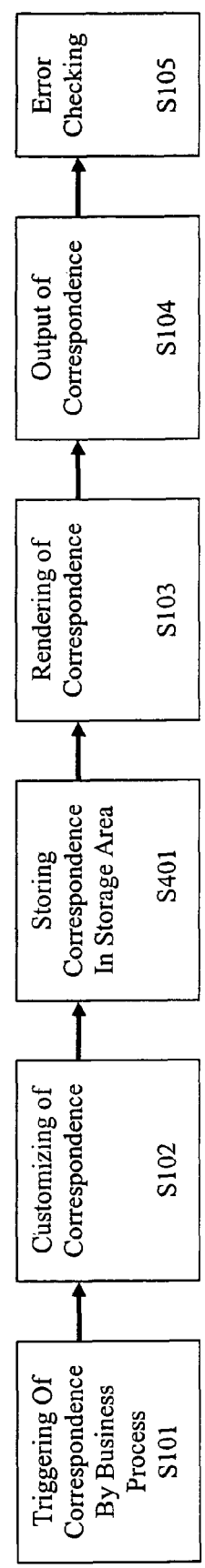
FIG. 4 shows a flow chart illustrating a method for stopping the output of a correspondence, according to an embodiment of the present disclosure.
Figure 5:
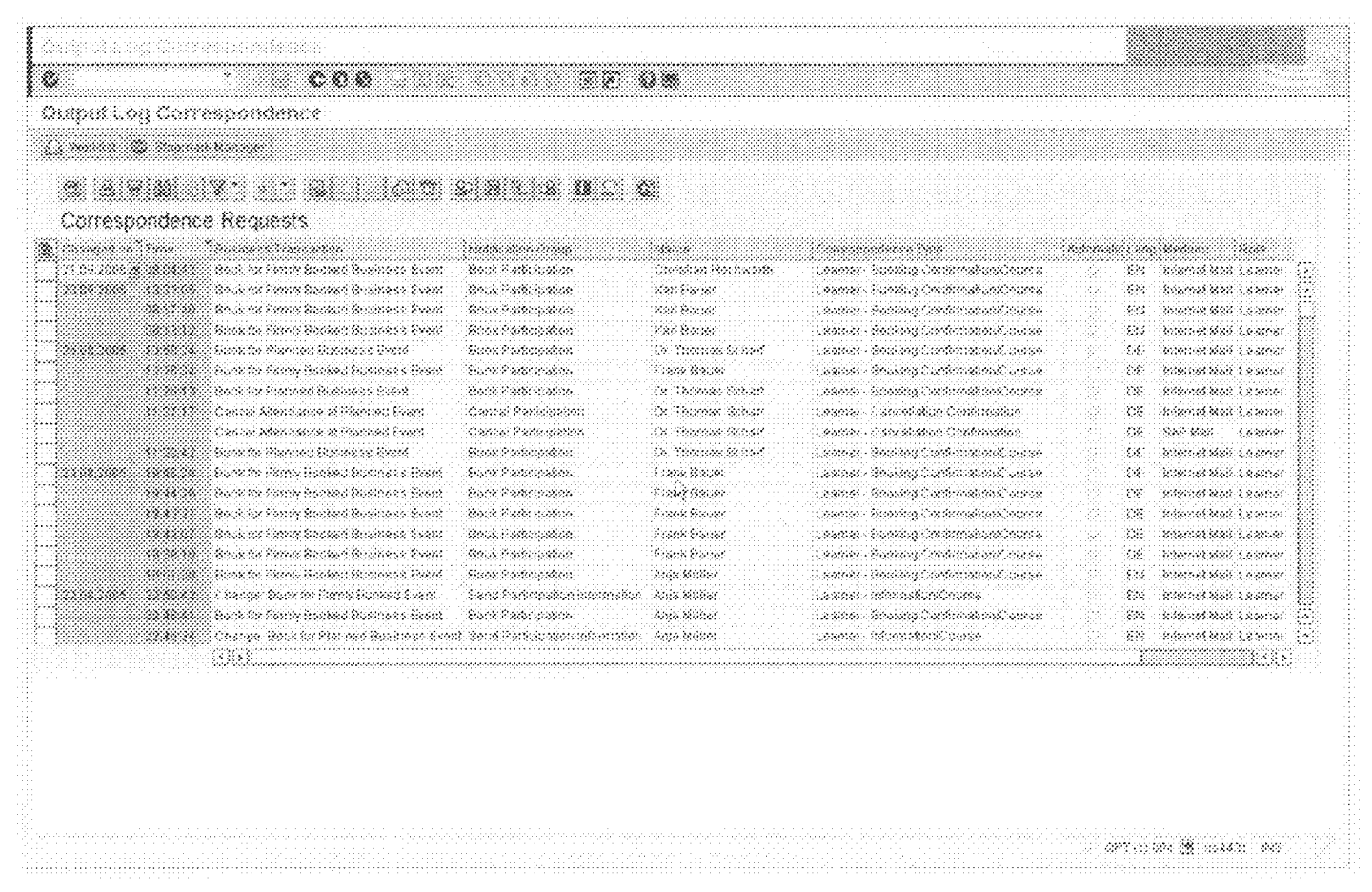

For example, in a training management system, automatic output from the system, such as a confirmation for a booking request, a cancellation request, room changes, etc. are typically automatically sent to users. According to an embodiment of the present disclosure, the automatic output of correspondence for business processes such as these may be prevented. For example, a user who typically receives course confirmation correspondence via email and may change the output medium to facsimile. FIG. 4 is a flow chart illustrating a method for stopping the output of a correspondence, according to an embodiment of the present disclosure. A business process triggers a correspondence (Step S101) and the correspondence is customized (Step S102) for the particular business process. Based on an automatic flag, the correspondence may be stored in a storage area (Step S401). For example, if the automatic flag is set, the system may ignore the storage step and proceed directly to the rendering step. However, if the flag is unset, the correspondence will be stored in the storage area. According to an embodiment of the present disclosure, the storage area may collect all correspondence and prevent it from being automatically output. FIG. 5 is a block diagram illustrating storage area. The correspondence may be collected and stored in the storage area for a predetermined amount of time. For example, the system may collect correspondence from a whole week and then a system administrator may perform various operations to each correspondence. The system may notify a user every time a correspondence is stored in the storage area. A user interface may also be provided with operations such as "Send," "Edit," "Delete," and "Preview" to enable a user to make changes to the correspondence before it is output. The correspondence may then be rendered, (Step S103) output (Step S104) and checked for errors in transmission (Step S105).

Figure 6:
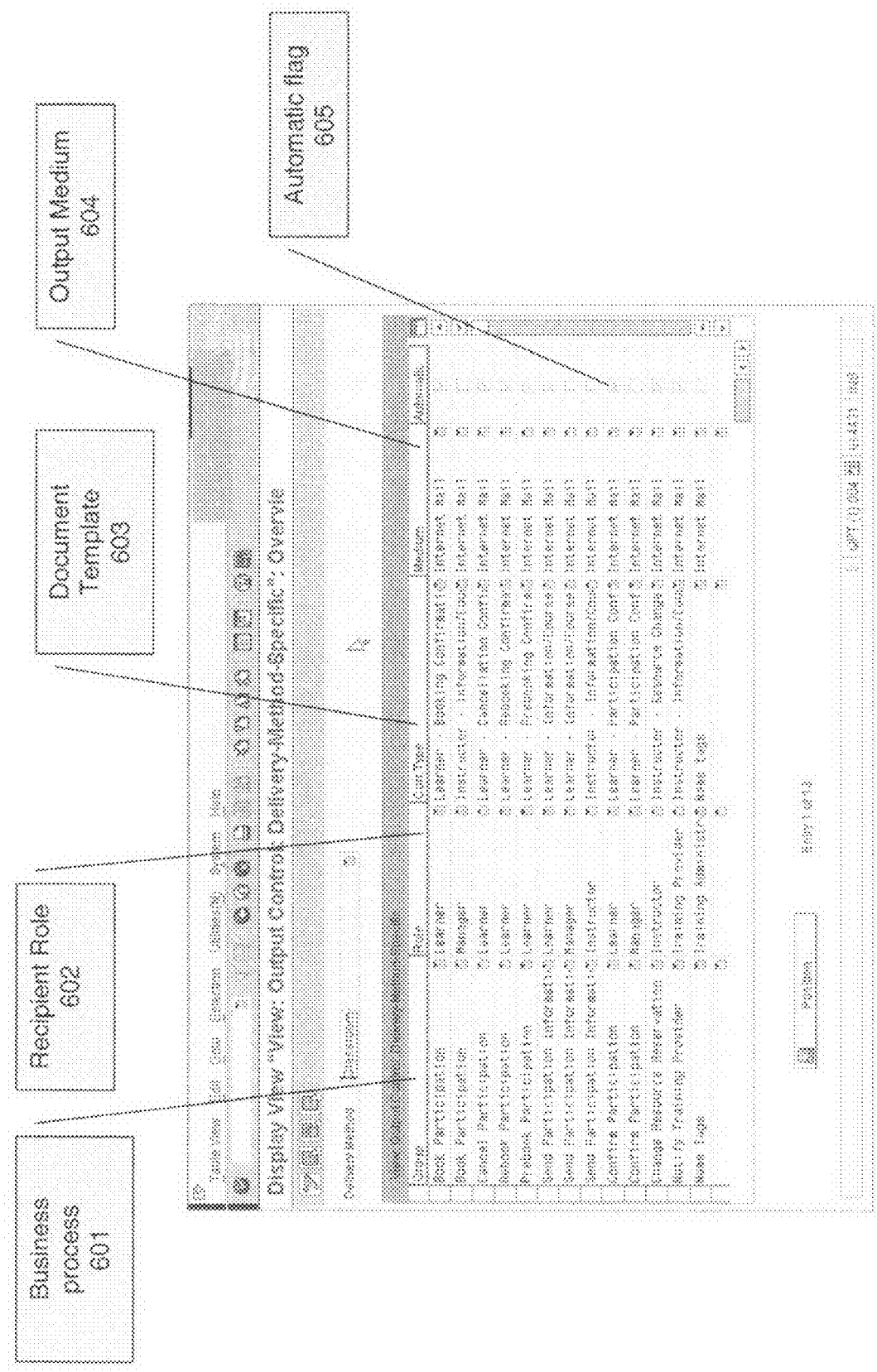
FIG. 6 shows a block diagram illustrating the global system customization of an automatic flag, according to an embodiment of the present disclosure.

According to an embodiment of the present disclosure, there are three ways that an automatic flag may be set. If the automatic flag is set, then the system will automatically output a correspondence. First, the automatic flag may be set through a global system customization. FIG. 6 is a block diagram illustrating the global system customization of an automatic flag, according to an embodiment of the present disclosure. The automatic flag 605 may be defined based on a delivery method, for example, Instructor-Led Training or Web-Based Training, or based on a business process 601, recipient role 602, document template 603, and output medium 604, such as facsimile, e-mail, printer, etc.

Figure 7:
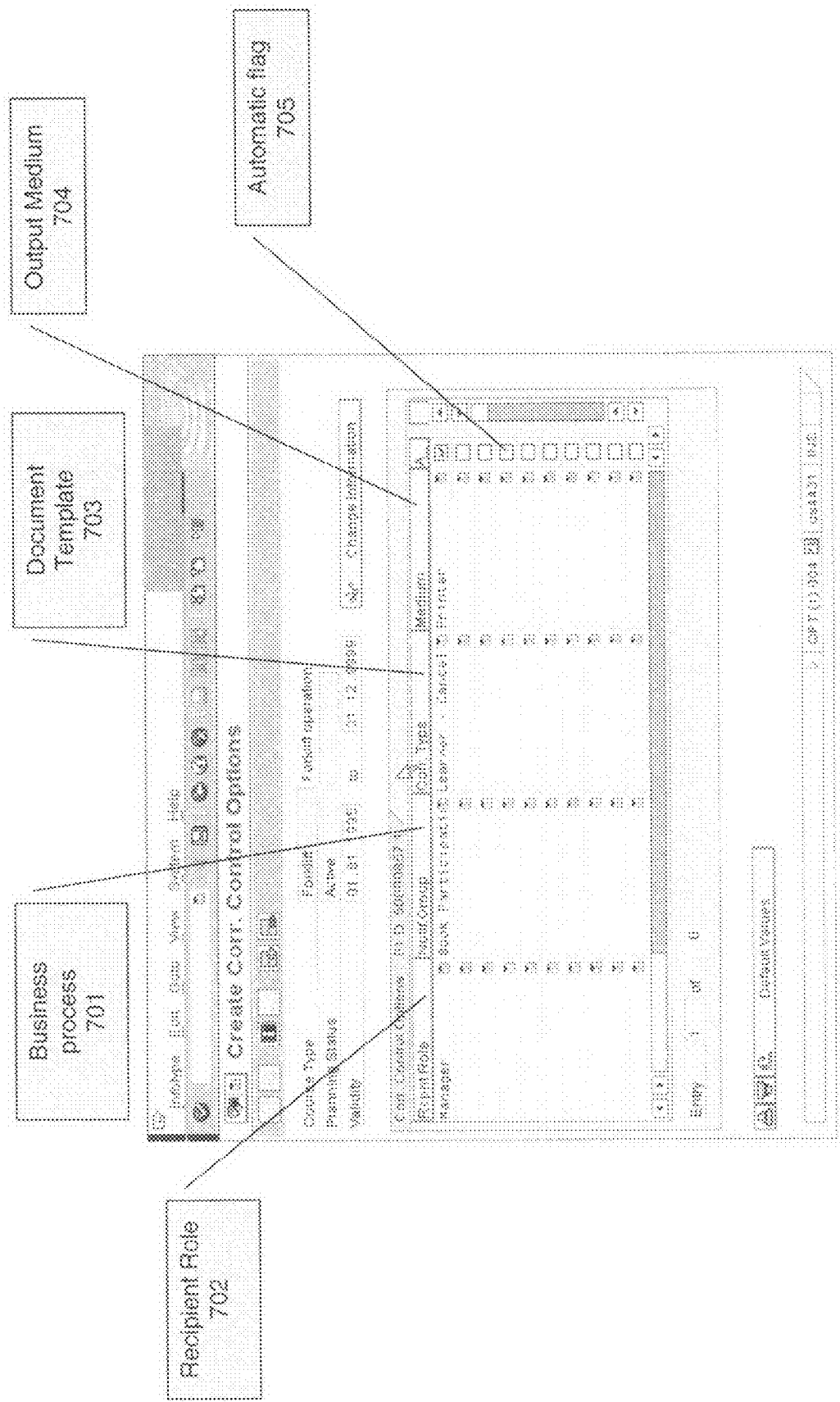
FIG. 7 shows a block diagram illustrating customizing of an automatic flag on a training level, according to an embodiment of the present disclosure.

Second, the automatic flag may be set on a training level by for example, a company who is administering the program. For example, the company can stop correspondence for a specific training. FIG. 7 is a block diagram illustrating customizing of an automatic flag on a training level. The automatic flag 705 may be defined based on a business process 701, recipient role 702, document template 703, and output medium 704.

Figure 8:
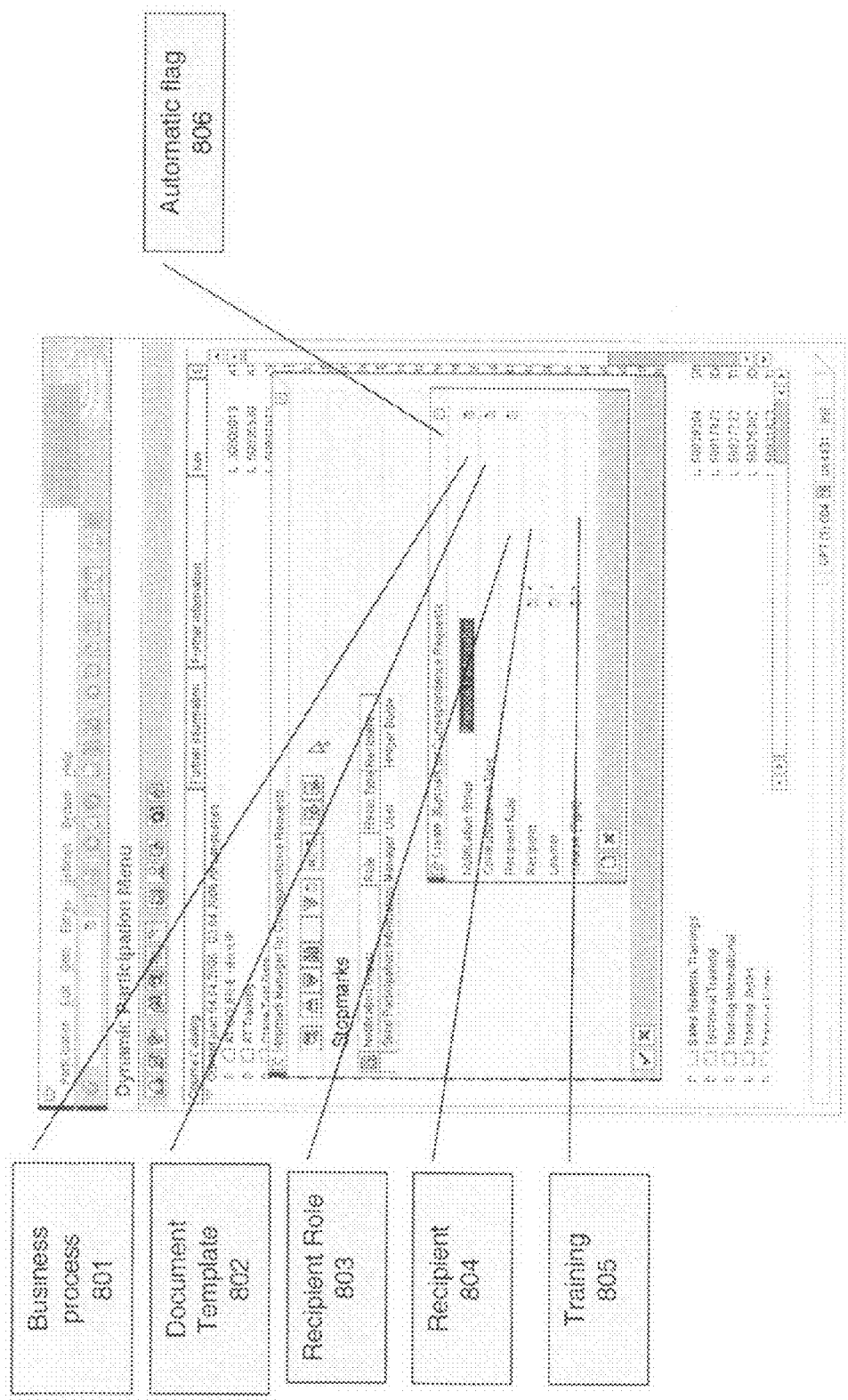
FIG. 8 is a block diagram illustrating setting of an automatic flag in the user settings, according to an embodiment of the present disclosure.

Third, the automatic flag may be set in the user settings. FIG. 8 is a block diagram illustrating setting of an automatic flag in the user settings. The automatic flag 806 may be defined based on a business process 801, recipient role 803, document template 802, training 805 and recipient 804.

FIG. 9 shows a flow chart illustrating a method for stopping the output of a correspondence, according to an embodiment of the present disclosure. Correspondence is started by a business process (Step S901). It is then determined whether there is any correspondence customized for the business process (Step S902). If it is determined that there is not any correspondence customized for the business process (No, Step S902), then the system exits (Step S914). If it is determined that there is a correspondence customized for the business process (Yes, Step S902), then the system creates a correspondence (Step S903) and determines whether there is an automatic flag defined in the user settings (Step S904). If it is determined that the automatic flag is defined in the user settings (Yes, Step S904), the system checks to see if the automatic flag is set (Step S905). If it is determined that the automatic flag is not defined in the user settings (No, Step S904), then the system checks to see if the automatic flag is defined in customizing for the correspondence (Step S906). If the automatic flag is not set (No, Step S905) or if the system determines that the automatic flag is not defined in the customizing for the correspondence (No, Step S906), then the correspondence is stored (Step S907), output is initiated (Step S908), and the correspondence is rendered (Step S909). If it is determined that there are any errors during rendering (Yes, Step S910), the system repeats Steps S907-S909. If there are no errors during rendering (No, Step S910), the rendered output is sent (Step S911). If it is determined that there are errors during output (Yes, Step S912), then the system repeats Steps S907-S911. If there are no errors during output (No, Step S912), then a record is created in a correspondence history (Step S913) and the system exits (Step S914). If it is determined that the automatic flag is set (Yes, S905) or if the system determines that the automatic flag is defined in the customizing for the correspondence (Yes, Step S906), the system ignores Steps S907 and S908 and commences at Step S909.

Numerous additional modifications and variations of the present disclosure are possible in view of the above-teachings. It is therefore to be understood that within the scope of the appended claims, the present disclosure may be practiced other than as specifically described herein. For example, elements and/or features of different illustrative embodiments may be combined with each other and/or substituted for each other within the scope of this disclosure and appended claims.

What is claimed is:

1. A computer implemented method for stopping output of a correspondence, comprising:
   creating, by a computer processor, a correspondence;
   determining, by the computer processor, whether an automatic output flag indicating whether the created correspondence is to be automatically output, is defined in user settings for the correspondence and, when defined, determining if the automatic output flag is set;
   determining, by the computer processor, whether an automatic output flag indicating whether the created correspondence is to be automatically output, is defined in customizing for the correspondence, when it is determined that the automatic output flag is not defined in the user settings;
   storing, by the computer processor, the created correspondence in a storage area when it is determined that the automatic output flag is not set in the user settings or when the automatic output flag is not defined in the customizing;
   initiating, by the computer processor, output of the created correspondence when it is determined that the automatic output flag is not set in the user settings or when the automatic output flag is not defined in the customizing; and
   rendering and outputting, by the computer processor, the created correspondence, wherein when the automatic output flag is set, the created correspondence is automatically rendered and output without storing and when the automatic output flag is not set or the automatic output flag is not defined in the customizing, a user is notified and the created correspondence is rendered and output from storage after allowing the user to make changes to the created correspondence in storage.

2. The computer implemented method of claim 1, wherein a correspondence is created by merging data into a template.

3. The computer implemented method of claim 1, wherein the correspondence is output if it is determined that the automatic output flag is defined in the customizing.

4. The computer implemented method of claim 1, wherein the correspondence is automatically output if it is determined that the automatic output flag is set in the user settings.

5. The computer implemented method of claim 1, wherein the step of rendering comprises checking for errors during rendering, outputting the correspondence and checking for errors during output.

6. The computer implemented method of claim 1, wherein the correspondence is stored in the storage area for a predetermined amount of time.

7. The computer implemented method of claim 1, further comprising sending a notification to user if the correspondence is stored in the storage area.

8. The computer implemented method of claim 1, further comprising a user interface to the storage area to enable a user to perform operations, including "send," "edit," "delete," or "preview."

9. The computer implemented method of claim 1, further comprising creating a record in a correspondence history.

10. The computer implemented method of claim 1, wherein the user settings for the correspondence comprise personalization for a business process, recipient role, document template, training and recipient.

11. The computer implemented method of claim 1, wherein the customizing for the correspondence comprises customization for a business process, recipient role, document template, and output medium.

12. The computer implemented method of claim 1, wherein the correspondence can be globally customized based on a business process, recipient role, document template, and output medium, if the automatic flag is not defined in the user settings or the customizing.

13. The computer implemented method of claim 11, wherein the output medium is facsimile, e-mail, or printer.

14. A program storage device readable by a computer, tangibly embodying and storing a program of instructions executable by the computer to perform the method of claim 1.

15. A computer system comprising:
 a processor; and
 a program storage device readable by the computer system, tangibly embodying and storing a program of instructions executable by the processor to perform the method of claim 1.

16. The computer system of claim 15, wherein a correspondence is created by merging data into a template.

17. The computer system of claim 15, wherein the correspondence is output if it is determined that the automatic output flag is defined in the customizing.

18. The computer system of claim 15, wherein the correspondence is output if it is determined that the automatic output flag is set in the user settings.

19. The computer system of claim 15, wherein the step of rendering comprises checking for errors during rendering, outputting the correspondence and checking for errors during output.

20. The computer system of claim 15, wherein the correspondence is stored in the storage area for a predetermined amount of time.

21. The computer system of claim 15, further comprising sending a notification to user if the correspondence is stored in the storage area.

22. The computer system of claim 15, further comprising a user interface to the storage area to enable a user to perform operations, including "send," "edit," "delete," or "preview."

23. The computer system of claim 15, further comprising creating a record in a correspondence history.

24. The computer system of claim 15, wherein the user settings for the correspondence comprise personalization for a business process, recipient role, document template, training and recipient.

25. The computer system of claim 15, wherein the customizing for the correspondence comprises customization for a business process, recipient role, document template, and output medium.

26. The computer system of claim 15, wherein the correspondence can be globally customized based on a business process, recipient role, document template, and output medium, if the automatic flag is not defined in the user settings or the customizing.

27. The computer system of claim 26, wherein the output medium is facsimile, e-mail, or printer.

28. A non-transitory computer readable storage medium including computer executable code for stopping output of a correspondence, comprising:
 code for creating a correspondence;
 code for determining whether an automatic output flag indicating whether the created correspondence is to be automatically output, is defined in user settings for the correspondence and, when defined, determining if the automatic output flag is set;
 code for determining whether an automatic output flag indicating whether the created correspondence is to be automatically output is defined in customizing for the correspondence, when it is determined that the automatic output flag is not defined in the user settings;
 code for storing the created correspondence in a storage area when it is determined that the automatic output flag is not set in the user settings or when the automatic output flag is not defined in the customizing; and
 code for initiating output of the created correspondence when it is determined that the automatic output flag is not set in the user settings or when the automatic output flag is not defined in the customizing; and
 code for rendering and outputting the created correspondence, wherein when the automatic output flag is set, the created correspondence is automatically rendered and output without storing and when the automatic output flag is not set or the automatic output flag is not defined in the customizing, a user is notified and the created correspondence is rendered and output from storage after allowing the user to make changes to the created correspondence in storage.

29. The non-transitory computer readable storage medium of claim 28, wherein a correspondence is created by merging data into a template.

30. The non-transitory computer readable storage medium of claim 28, wherein the correspondence is automatically output if it is determined that the automatic output flag is defined in the customizing.

31. The non-transitory computer readable storage medium of claim 28, wherein the correspondence is output if it is determined that the automatic output flag is set in the user settings.

32. The non-transitory computer readable storage medium of claim 28, wherein the step of rendering comprises checking for errors during rendering, outputting the correspondence and checking for errors during output.

33. The non-transitory computer readable storage medium of claim 28, wherein the correspondence is stored in the storage area for a predetermined amount of time.

34. The non-transitory computer readable storage medium of claim 28, further comprising sending a notification to user if the correspondence is stored in the storage area.

35. The non-transitory computer readable storage medium of claim 28, further comprising a user interface to the storage area to enable a user to perform operations, including "send," "edit," "delete," or "preview."

36. The non-transitory computer readable storage medium of claim 28, further comprising creating a record in a correspondence history.

37. The non-transitory computer readable storage medium of claim 28, wherein the user settings for the correspondence comprise personalization for a business process, recipient role, document template, training and recipient.

38. The non-transitory computer readable storage medium of claim 28, wherein the customizing for the correspondence comprises customization for a business process, recipient role, document template, and output medium.

39. The non-transitory computer readable storage medium of claim 28, wherein the correspondence can be globally customized based on a business process, recipient role, document template, and output medium, if the automatic flag is not defined in the user settings or the customizing.

40. The non-transitory computer readable storage medium of claim 39, wherein the output medium is facsimile, e-mail, or printer.

* * * * *